(12) United States Patent
Yuki et al.

(10) Patent No.: US 12,311,766 B2
(45) Date of Patent: May 27, 2025

(54) LIQUID CRYSTAL DISPLAY DEVICE

(71) Applicant: Sharp Display Technology Corporation, Kameyama (JP)

(72) Inventors: Ryuzo Yuki, Kameyama (JP); Naru Usukura, Kameyama (JP); Junichi Masuda, Kameyama (JP); Shugo Yagi, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/609,941

(22) Filed: Mar. 19, 2024

(65) Prior Publication Data

US 2024/0351441 A1    Oct. 24, 2024

(30) Foreign Application Priority Data

Apr. 19, 2023    (JP) ................. 2023-068691

(51) Int. Cl.
  *B60K 35/81*    (2024.01)
  *B60K 35/65*    (2024.01)
  *G02F 1/13357*    (2006.01)

(52) U.S. Cl.
  CPC ............ *B60K 35/81* (2024.01); *B60K 35/656* (2024.01); *G02F 1/133615* (2013.01); *B60K 2360/336* (2024.01)

(58) Field of Classification Search
  CPC .............. G02F 1/133615; B60K 35/81; B60K 2360/336; B60K 35/656
  USPC ......................................................... 349/62
  See application file for complete search history.

(56) References Cited

U.S. PATENT DOCUMENTS

2023/0273362 A1    8/2023    Yagi et al.

FOREIGN PATENT DOCUMENTS

| JP | 2011-511508 A | 4/2011 | |
|---|---|---|---|
| JP | 2017-506762 A | 3/2017 | |
| JP | 2023-125175 A | 9/2023 | |
| WO | WO-2009088658 A1 * | 7/2009 | ......... G02B 27/2214 |
| WO | 2015/077272 A1 | 5/2015 | |

* cited by examiner

*Primary Examiner* — Michael H Caley
*Assistant Examiner* — William D Peterson
(74) *Attorney, Agent, or Firm* — ScienBiziP, P.C.

(57) ABSTRACT

A liquid crystal display device includes a backlight module configured to switch between first light having a maximum luminance in a first direction and second light having a maximum luminance in a second direction different from the first direction and emit the first light and the second light from a main surface, a liquid crystal display panel, and a control device. The control device receives a first image and generates a first offset image based on the first image, the first offset image being an image obtained by reversing a color of the first image and having a luminance adjusted, controls the liquid crystal display panel such that a first display image including the first image and a second display image including the first offset image are alternately displayed, and controls the backlight module so that the first light is emitted when the first display image is displayed and the second light is emitted when the second display image is displayed. A luminance of the first offset image is substantially equal to a luminance in the second direction when the liquid crystal display panel displays the first display image.

6 Claims, 18 Drawing Sheets

LIQUID CRYSTAL DISPLAY DEVICE

CROSS-REFERENCE TO RELATED APPLICATIONS

This application claims the benefit of priority to Japanese Patent Application Number 2023-068691 filed on Apr. 19, 2023. The entire contents of the above-identified application are hereby incorporated by reference.

BACKGROUND

Technical Field

The disclosure relates to a liquid crystal display device.

Liquid crystal display devices are used in various fields and have been widely used for vehicles. For example, vehicles in which a liquid crystal display device is disposed in front of a front passenger seat have been put to practical use.

For example, a movie or the like may be displayed on the liquid crystal display device disposed in front of the front passenger seat, but it is not preferable from the viewpoint of safety that such an image be visible to a driver who is driving. For this reason, there is a demand for a technique for preventing the driver from visually recognizing an image on the liquid crystal display device in front of the front passenger seat during driving.

For example, JP 2011-511508 A discloses a method of preventing crosstalk between a first image and a second image, that is, preventing the second image from being perceived by a first viewer and preventing the first image from being perceived by a second viewer, when the first image is mainly provided to the first viewer (driver) and the second image is mainly provided to the second viewer (a passenger in a front passenger seat).

SUMMARY

An object of the disclosure is to provide a liquid crystal display device in which crosstalk is further suppressed.

A liquid crystal display device according to an embodiment of the disclosure includes a backlight module configured to switch between first light having a maximum luminance in a first direction and second light having a maximum luminance in a second direction different from the first direction and emit the first light and the second light from a main surface, a liquid crystal display panel configured to be disposed to transmit the first light and the second light, and a control device configured to control the liquid crystal display panel and the backlight module, in which the control device receives a first image and generates a first offset image based on the first image, the first offset image being an image obtained by reversing a color of the first image and having a luminance adjusted, controls the liquid crystal display panel such that a first display image including the first image and a second display image including the first offset image are alternately displayed, and controls the backlight module so that the first light is emitted when the first display image is displayed and the second light is emitted when the second display image is displayed, and a luminance of the first offset image is substantially equal to a luminance in the second direction when the liquid crystal display panel displays the first display image.

According to an embodiment of the disclosure, it is possible to provide a liquid crystal display device in which crosstalk is further suppressed.

BRIEF DESCRIPTION OF DRAWINGS

The disclosure will be described with reference to the accompanying drawings, wherein like numbers reference like elements.

DESCRIPTION OF EMBODIMENTS

Figure 1:
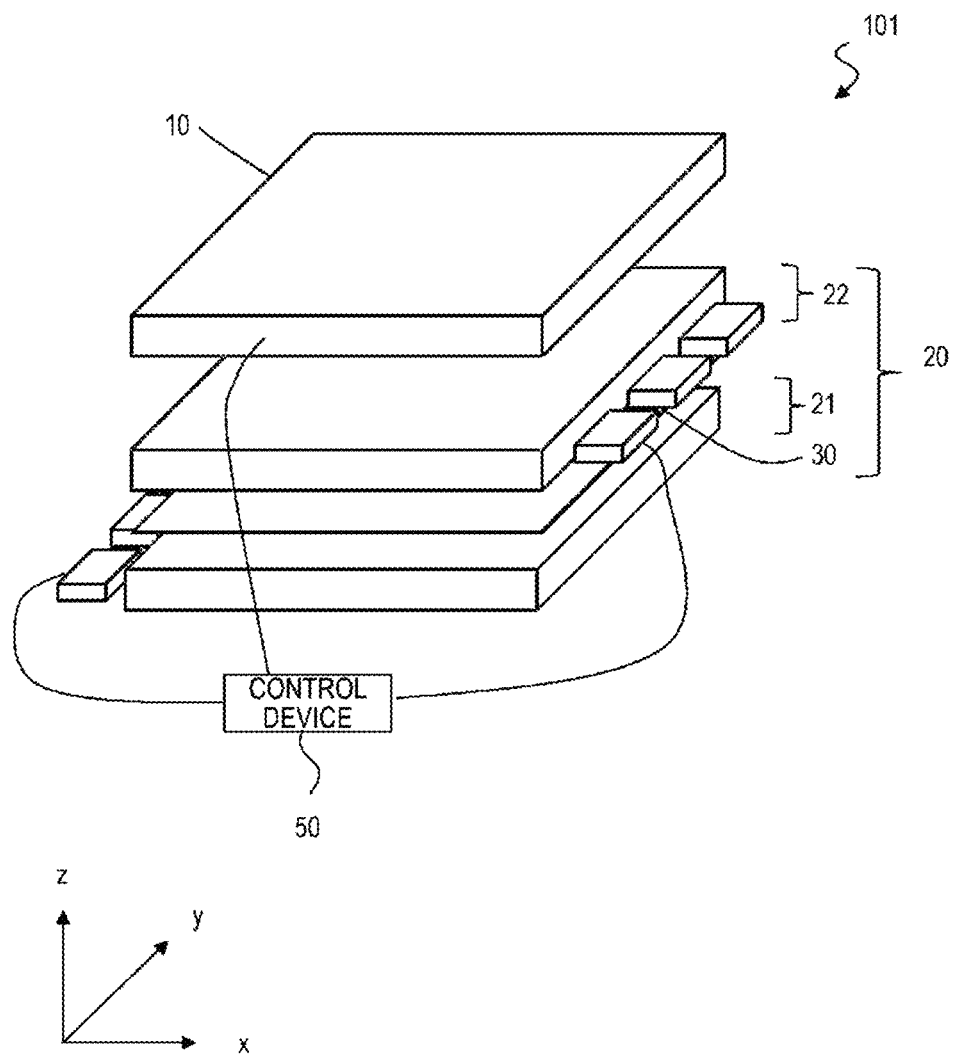
FIG. 1 is a diagram schematically illustrating a configuration of a liquid crystal display device according to a first embodiment.

Embodiments of the disclosure will be described below with reference to the drawings. The disclosure is not limited to the following embodiments, and appropriate design changes can be made within a scope that satisfies the configuration of the disclosure. Further, in the description below, the same reference signs may be used in common among the different drawings for the same portions or portions having the same or similar functions, and descriptions of repetitions thereof may be omitted. Further, the configurations described in the embodiments and the modification examples may be combined or modified as appropriate within a range that does not depart from the gist of the disclosure. For ease of description, in the drawings referenced below, configurations may be simplified or schematically illustrated, or a portion of the components may be omitted. Further, dimensional ratios between components illustrated in the drawings are not necessarily indicative of actual dimensional ratios.

First Embodiment

FIG. 1 is a diagram schematically illustrating a configuration of a liquid crystal display device according to a first embodiment. A liquid crystal display device 100 includes a liquid crystal display panel 10, a backlight module 20, and a control device 50. The liquid crystal display panel 10 may be a liquid crystal display panel using any of various driving methods. Preferably, the liquid crystal display panel 10 is a high-speed driving panel. Here, the "high speed" means a refresh rate higher than 60 Hz which is a general refresh rate. More preferably, the liquid crystal display panel 10 can be driven at a refresh rate equal to or higher than 240 Hz. As will be described below in detail, the backlight module 20 can switch between and emit first light having a maximum luminance in a first direction and second light having a maximum luminance in a second direction.

The backlight module 20 includes a first backlight 21, a second backlight 22, and a light control body 30.

Figure 2:
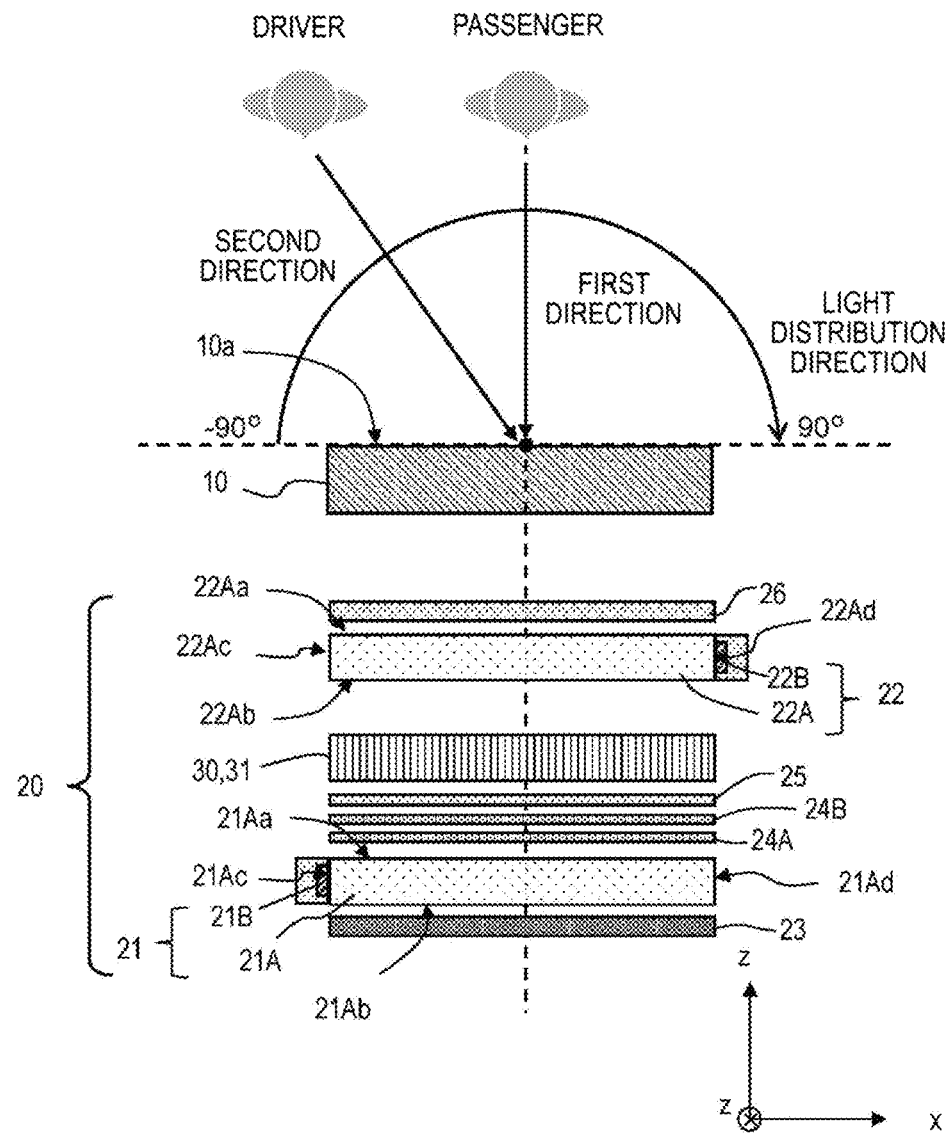
FIG. 2 illustrates an example of a schematic cross-sectional structure of a backlight module.

FIG. 2 illustrates an example of a schematic cross-sectional structure of the backlight module 20. The first backlight 21 includes a first light guide plate 21A and a first light-emitting element 21B. The first light guide plate 21A has a plate shape having a main surface 21Aa and a main surface 21Ab, and two side surfaces 21Ac and 21Ad perpendicular to an x-axis direction (third direction) which is a horizontal direction. The first light guide plate 21A is made of a transmissive resin such as polycarbonate and acrylic.

The first light-emitting element 21B is, for example, a side-view LED and is disposed to face the side surface 21Ac. Light emitted from the first light-emitting element 21B is incident on the first light guide plate 21A from the side surface 21Ac, and is emitted from the main surface 21Aa and the main surface 21Ab while being reflected between the main surface 21Aa and the main surface 21Ab.

Similarly, the second backlight 22 includes a second light guide plate 22A and a second light-emitting element 22B. The second light guide plate 22A has a plate shape having a main surface 22Aa and a main surface 22Ab, and two side surfaces 22Ac and 22Ad perpendicular to the x-axis direction. The second light guide plate 22A is made of a transmissive resin such as polycarbonate and acrylic.

The second light-emitting element 22B is, for example, a side-view LED and is disposed to face the side surface 22Ad. Light emitted from the second light-emitting element 22B is incident on the second light guide plate 22A from the side surface 22Ad, and is emitted from the main surface 22Aa and the main surface 22Ab while being reflected between the main surface 22Aa and the main surface 22Ab.

Figure 3A:
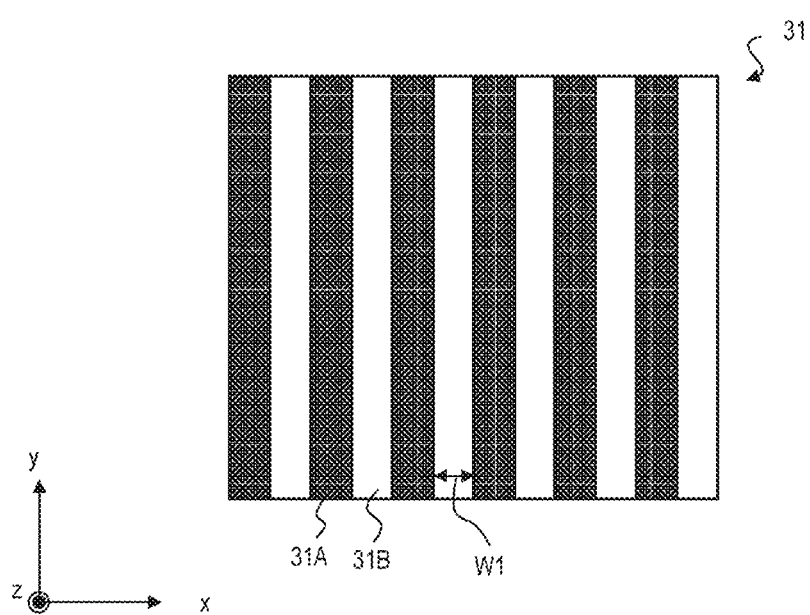
FIG. 3A is a plan view of a first optical sheet.
Figure 3B:
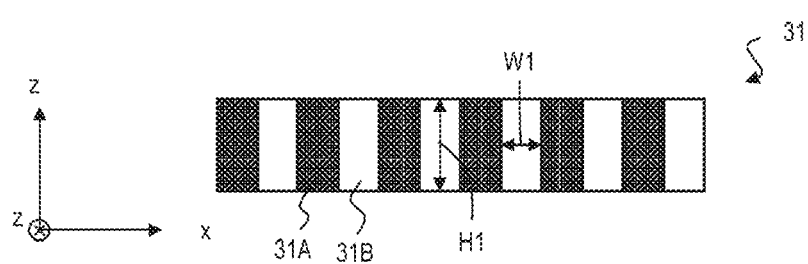
FIG. 3B is a cross-sectional view of the first optical sheet.

The light control body 30 includes a first optical sheet 31. FIG. 3A and FIG. 3B are a plan view and a cross-sectional view of the first optical sheet 31, respectively. The first optical sheet 31 includes a plurality of first light blocking portions 31A disposed at intervals in the x-axis direction and a plurality of first light transmitting portions 31B each positioned between the plurality of first light blocking portions 31A.

The first light blocking portion 31A has a light blocking property, and the first light transmitting portion 31B has a light transmitting property. For example, the first light blocking portion 31A has a visible light transmittance of 40% or less. More preferably, the first light blocking portion 31A has a visible light transmittance of 20% or less. On the other hand, the first light transmitting portion 31B has a visible light transmittance of 46% or more. More preferably, the first light transmitting portion 31B has a visible light transmittance of 80% or more. The first light transmitting portion 31B is made of, for example, a black resin, and the first light transmitting portion 31B is made of a transparent resin.

Each first light blocking portion 31A extends in a z-axis direction (thickness direction) and a y-axis direction (fourth direction). It is preferable that a width W1 in the x-axis direction and a height H1 in the z-axis direction of each first light transmitting portion 31B satisfy a relationship of W1/H1<1. For example, W1 is in a range of 60 µm to 150 µm, H1 is in a range of 160 µm to 1500 µm, and W1/H1 is in a range of 0.04 to 0.9375.

In the backlight module 20, the light control body 30 is disposed between the first backlight 21 and the second backlight 22, and the second backlight 22 is located between the light control body 30 and the liquid crystal display panel 10. The backlight module 20 is disposed with respect to the liquid crystal display panel 10 so that the first light and the second light emitted from the backlight module 20 are incident on the liquid crystal display panel 10.

The backlight module 20 is turned on under the control of the control device 50. Specifically, one of the first backlight 21 and the second backlight 22 is selectively turned on. When the first backlight 21 is turned on, light emitted from the first light-emitting element 21B is incident on the first light guide plate 21A, and first light is emitted from the main surface 21Aa and the main surface 21Ab.

The first light emitted from the main surface 21Aa is incident on light control body 30. Since the first optical sheet 31 of the light control body 30 has the above-described structure, the first light obliquely incident on the light control body 30 is incident on and absorbed by the first light blocking portion 31A. For this reason, only light incident substantially parallel to the z-axis direction passes through the light control body 30, further passes through the second light guide plate 22A of the second backlight 22, and is incident on the liquid crystal display panel 10. Further, the first light from the first backlight 21 passes through the liquid crystal display panel 10 and is emitted to the outside of the liquid crystal display device 101.

Figure 4:
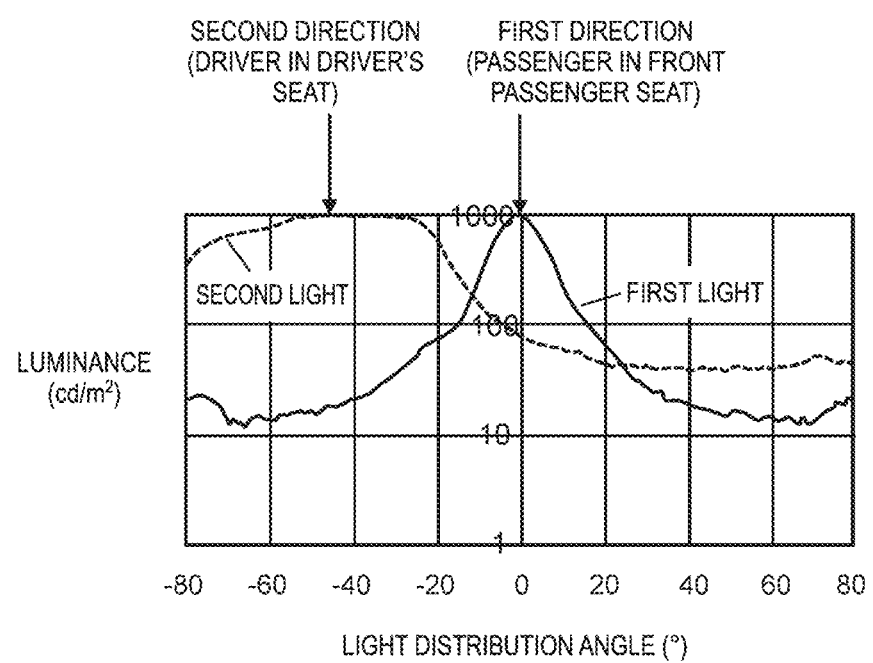
FIG. 4 illustrates an example of light distribution characteristics of first light and second light emitted from the liquid crystal display device according to the first embodiment.

In this manner, the first light emitted from the first backlight 21 passes through the light control body 30, and thus is prevented from being emitted in a spread manner. FIG. 4 illustrates an example of a light distribution characteristic of the first light emitted from a main surface 10a of the liquid crystal display panel 10. Light is emitted in a narrow range perpendicular to the main surface 10a, that is, in the vicinity of 0°. For example, the first light is emitted at a narrow angle of approximately 0°+15°.

On the other hand, when the second backlight 22 is turned on, light emitted from the second light-emitting elements 22B is incident on the second light guide plate 22A, and the second light is emitted from the main surface 22Aa and the main surface 22Ab.

The second light emitted from the main surface 22Aa is incident on the liquid crystal display panel 10. Further, the second light passes through the liquid crystal display panel 10 and is emitted to the outside of the liquid crystal display device.

Since the second light does not pass through the light control body 30, the second light is emitted from the main surface 10a of the liquid crystal display panel 10 at a wide angle without being particularly limited. However, in the second backlight 22, the second light is incident from a side surface 22Bd of the second light guide plate 22A, and thus a distribution in an angle range in which a luminance is high deviates in the negative direction of the x-axis from the direction of 0° perpendicular to the main surface 10a. For example, as illustrated in FIG. 4, a luminance increases in a range of approximately −15° to −80°.

Since the backlight module 20 selectively emits the first light and the second light in this manner, the liquid crystal display device 101 according to the present embodiment displays the light emitted from the liquid crystal display panel 10, that is, the image displayed on the liquid crystal display panel 10, so that the image can be viewed mainly from a specific direction. For example, an image displayed by turning on the first backlight 21 can be visually recognized from a first direction of approximately 0°+15°, and an image displayed by turning on the second backlight 22 can be visually recognized from a second direction of approximately −15° to −80°. For example, when the liquid crystal display device 101 according to the present embodiment is disposed in front of a front passenger seat of a vehicle, the first direction is a direction in which a passenger in the front passenger seat can view an image. The second direction is a direction in which a driver in a driver's seat can visually recognize the image. The first direction and the second direction are on a plane in a direction parallel to and vertically intersecting the main surface 10a of the liquid crystal display panel 10.

However, as illustrated in FIG. 4, the first light is emitted with some intensity also in the second direction. For this reason, the image is displayed for the passenger in the front passenger seat, and the driver can visually recognize the image. The liquid crystal display device 101 controls the display of the image so that a crosstalk image is hardly visually recognized by the driver.

The backlight module 20 may further include a reflection sheet 23 on the main surface 21Ab side of the first light guide plate 21A. Thereby, the light emitted from the first backlight 21 and the second backlight 22 toward a side opposite to the liquid crystal display panel 10 can be reflected toward the liquid crystal display panel 10.

The backlight module 20 may further include prism sheets 24A and 24B and a reflective polarizer 25 between the first backlight 21 and the light control body 30 in order to increase the directivity of the first light emitted from the first backlight 21 in the first direction.

The backlight module 20 may further include a diffuser sheet 26 between the second backlight 22 and the liquid crystal display panel 10 in order to increase the uniformity of the second light.

The control device 50 includes a memory and an arithmetic device such as a CPU, and controls the liquid crystal display panel 10 and the backlight module 20. Specifically, the control device 50 controls how the image is displayed so that the image displayed for the passenger in the front passenger seat is less likely to be visually recognized by the driver.

Operations of the liquid crystal display device 101 and the control device 50 according to the present embodiment will be described.

Figure 5:
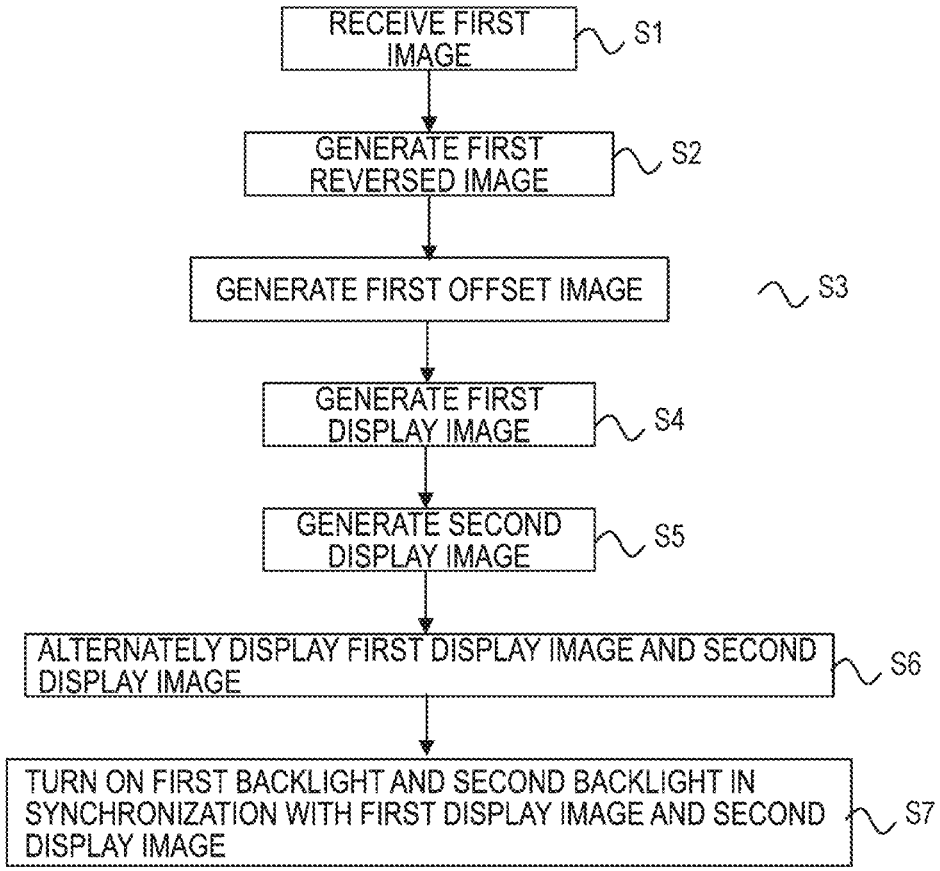
FIG. 5 is a flowchart showing an operation of the liquid crystal display device according to the first embodiment.
Figure 6:
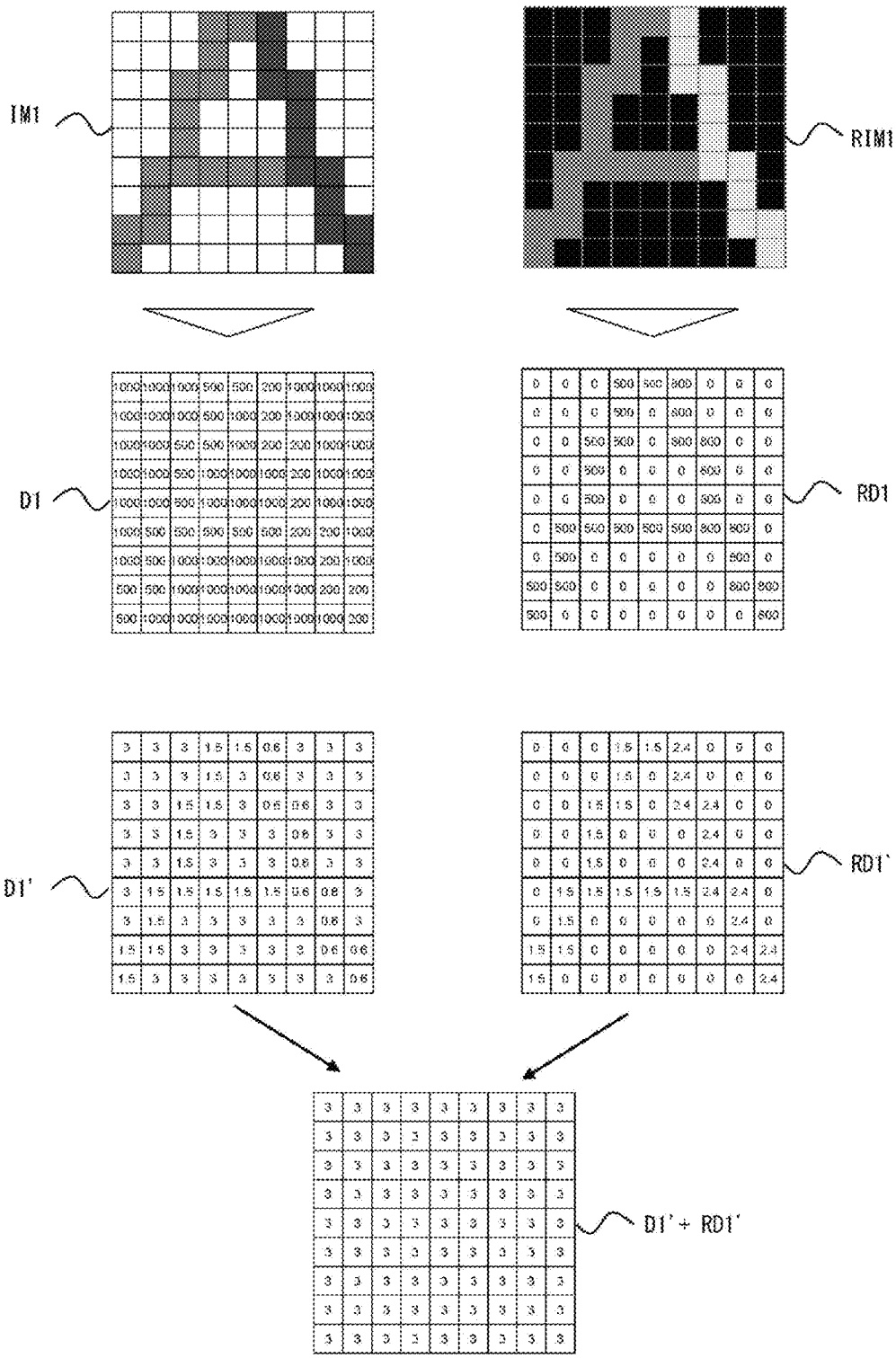
FIG. 6 is a schematic view illustrating an example of image data to be generated.

FIG. 5 is a flowchart showing an operation of the liquid crystal display device according to the present embodiment, and FIG. 6 is a schematic view illustrating an example of image data to be generated. The liquid crystal display device according to the present embodiment provides a first image to a passenger sitting in a front passenger seat. The first image is, for example, an entertainment content such as a movie. Since it is not preferable that the driver pay attention to the first image while driving the vehicle, the first image is made difficult to be visually recognized.

(1) Generation of First Reversed Color Image (S1, S2)

First, the control device 50 receives the first image (S1) and generates, from the first image, a first reversed color image which is an image obtained by reversing the color of the first image. For example, as illustrated in FIG. 6, the control device 50 generates a first image IM1 which is a reversed color image of a first reversed color image RIM1. Each pixel value Lp pixel of the first reversed color image RIM1 is expressed by, for example, Formula (1) where a luminance value of each pixel of the first image IM1 is $L_{pixel}$ and a maximum luminance in the first image is $L_{max}$. The reversed color image is an image in which the color is replaced with a color at an opposite position in the hue circle. The reversed color image can be generated by converting the luminances of respective colors of RGB in accordance with Formula (1). When the first image is a monochrome image, a reversed color image can be generated in the same manner.

$$L_{p\_pixel} = L_{max} - L_{pixel} \quad (1)$$

A value in Formula (1) may be based on, for example, the maximum luminance value (for example, 1000 cd/m$^2$) in the liquid crystal display panel 10. When image processing is performed with 8-bit data (0 to 255), 255 gray scales may be adopted as the maximum luminance. For example, when the maximum luminance is 1000 cd/m$^2$, the first image IM1 is represented by data D1, and the first reversed color image RIM1 is represented by data RD1.

(2) Generation of First Offset Image (S3)

Subsequently, a first offset image is generated. The control device 50 stores, for example, a crosstalk coefficient $a_{leak}$ which is the proportion of a luminance value of the first image IM1 emitted in the second direction when the first image IM1 is displayed in the first direction. The crosstalk coefficient $a_{leak}$ is expressed by the following Formula (2) where a luminance value of each pixel of the first image IM1 emitted in the first direction is $L_{pixel\_P}$ and a luminance value of each pixel of the first image IM1 emitted in the second direction is $L_{pixel\_D}$.

$$a_{leak} = L_{pixel\_D}/L_{pixel\_P} \quad (2)$$

The crosstalk coefficient $a_{leak}$ may be obtained from light distribution characteristics of the first backlight 21 as illustrated in FIG. 4.

The control device 50 multiplies the generated first reversed color image RIM1 by the crosstalk coefficient $a_{leak}$ to generate a first offset image RIM1' which is a first reversed color image with an adjusted luminance. A luminance value $L_{D\_pixel}$ of each pixel of the first offset image RIM1' is expressed by the following Formula (3).

$$L_{D\_pixel} = a_{leak} \cdot L_{p\_pixel} \quad (3)$$

For example, when the crosstalk coefficient $a_{leak}$ is 0.003, data RD1' of the obtained first offset image RIM1' is as illustrated in FIG. 6. By being multiplied by the crosstalk coefficient $a_{leak}$, an average luminance of the entire image of the first offset image RIM1' is smaller than that of the first image IM1.

(3) Generation of First Display Image and Second Display Image (S4, S5)

The control device 50 generates a first display image to be displayed when the first backlight 21 is turned on and a second display image to be displayed when the second backlight 22 is turned on. Specifically, the control device 50 generates the first display image including the first image IM1 and the second display image including the first offset image RIM1'.

(4) Display of First Display Image and Second Display Image (S6, S7)

Subsequently, the control device 50 alternately displays the first display image and the second display image on the liquid crystal display panel 10. At this time, the control device 50 synchronizes the timing of switching between the display of the first display image and the display of the second display image with the timing of switching between turn-on of the first backlight 21 and turn-on of the second backlight 22. Specifically, the control device 50 turns on the first backlight 21 at a timing when the first display image is displayed on the liquid crystal display panel 10, and turns on the second backlight 22 at a timing when the second display image is displayed on the liquid crystal display panel 10.

Figure 7:
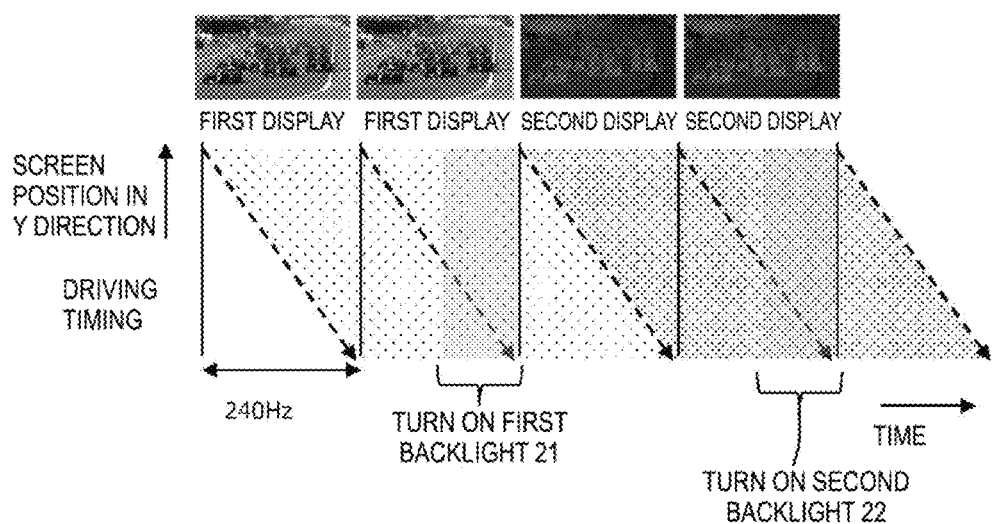
FIG. 7 is a schematic view illustrating an image to be displayed on a liquid crystal display panel and the timing of turn-on of the backlight module.

FIG. 7 is a schematic view illustrating an image to be displayed on the liquid crystal display panel 10 and the timing of turn-on of the backlight module 20. For example, the control device 50 alternately displays first display images of an even-numbered field and an odd-numbered field and second display images of an even-numbered field and an odd-numbered field on the liquid crystal display panel 10 by interlace driving. The fields are displayed, for example, at a frequency of 240 Hz, the first backlight 21 is turned on in a portion of a period in which the first display image is displayed, and the second backlight 22 is turned on in a portion of a period in which the second display image is displayed. For example, turn-on periods of the first backlight 21 and the second backlight are approximately 2.1 ms.

Figure 8:
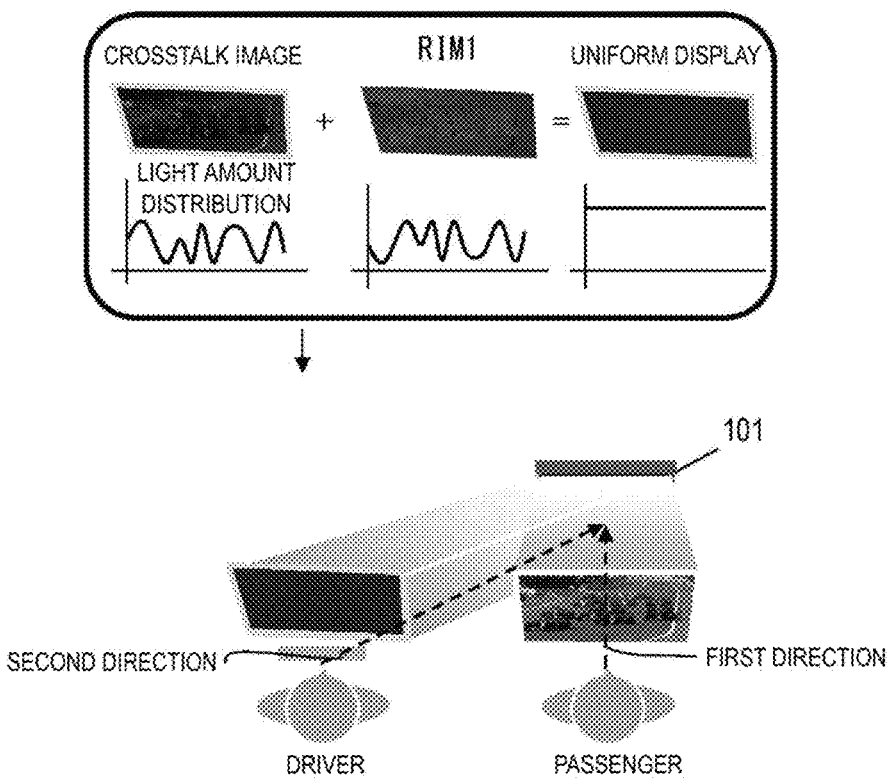
FIG. 8 is a schematic view illustrating how an image displayed on the liquid crystal display device of the first embodiment is viewed.

FIG. 8 is a schematic view illustrating how an image displayed on the liquid crystal display device 101 is viewed by the above-described control. Although the first display image and the second display image are alternately displayed, the first display image is displayed for a passenger in a front passenger seat who views the liquid crystal display device 101 from the first direction with a high luminance when the first backlight 21 is turned on. On the other hand, the second display image displayed when the second backlight 22 is turned on does not have a high luminance, and the second backlight 22 does not emit light with a high luminance in the first direction due to its light distribution characteristics. For this reason, the passenger can clearly recognize the first display image which is the first image, and hardly recognizes the second image.

On the other hand, the driver in the driver's seat who views the liquid crystal display panel 10 from the second direction recognizes a crosstalk image of the first display image when the first backlight 21 is turned on. When the second backlight 22 is turned on, the second display image is recognized from the driver's seat. The second display image is the first offset image RIM1' whose luminance has been adjusted by being multiplied by the crosstalk coefficient $a_{leak}$.

As illustrated in FIG. 6, the crosstalk image of the first display image is represented by data D1' obtained by multiplying the data D1 of the first image IM1 by the crosstalk coefficient $a_{leak}$. The crosstalk image and the first offset image RIM1' of the first display image have a relationship of reversed colors and have the same level of luminance value. For this reason, as indicated by data of D1'+RD1' obtained by superimposing these two images, the two images cancel each other out and are recognized by the driver as a substantially uniform achromatic image. For this reason, the driver does not recognize the first image.

In this manner, according to the present embodiment, when the second backlight whose directivity is enhanced toward the driver is turned on, the reversed color image of the first image displayed for the passenger in the front passenger seat is displayed after the luminance thereof has been adjusted. For this reason, the crosstalk image of the first display image is efficiently canceled out, the first display image is displayed with a uniform luminance, and it is possible to prevent the first display image from being visually recognized by the driver.

Second Embodiment

Figure 9:
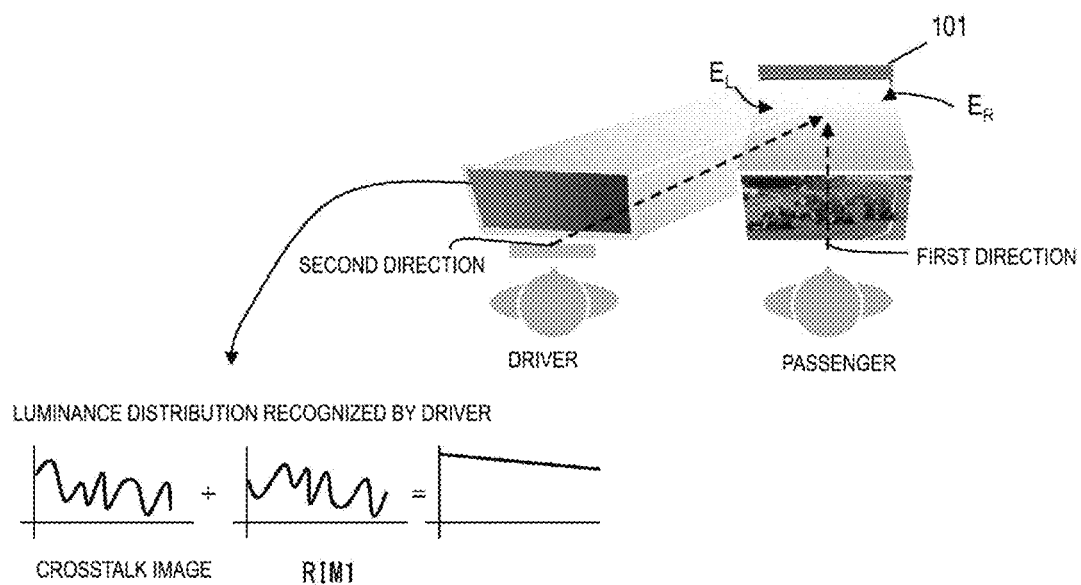
FIG. 9 is a schematic view illustrating a luminance distribution of a screen of the liquid crystal display device which is recognized by a driver.

A liquid crystal display device according to the present embodiment will be described. When the liquid crystal display device is disposed in front of a passenger in a front passenger seat, a driver views a screen of the liquid crystal display device from a second direction as illustrated in FIG. 9. A distance from the driver to an end $E_R$ is relatively long, and a distance from the driver to an end $E_L$ is relatively short. For this reason, on the screen of the liquid crystal display device 101, even when a crosstalk image of a first display image is efficiently canceled out and displayed with a uniform luminance, the driver can visually recognize the screen of a uniform achromatic color as being relatively dark on the end $E_R$ side and relatively bright on the end $E_L$ side.

In order to suppress such display, when the luminance of a first reversed color image is adjusted, a luminance distribution may be provided in the horizontal direction. Specifically, a luminance value $L_{D\_pixel}$ of each pixel of a first offset image RIM1' is weighted in accordance with an x coordinate of the pixel. For example, when x is an x coordinate of each pixel, $x_{max}$ is a maximum value of the x coordinate of the pixel, and $\beta$ is a weight coefficient, a luminance value $L_{CD\_pixel}$ of each pixel of the corrected first offset image RIM1' is represented by Formula (4).

$$L_{CD\_pixel} = (1 + \beta x/x_{max})L_{D\_pixel} \quad (4)$$

For example, when a distance from the driver to the end $E_R$ is relatively long and a distance from the driver to the end $E_L$ is relatively short, the coefficient $\beta$ is a value in the range of $0<\beta\leq 0.5$. When a distance to the end $E_L$ is relatively long and a distance to the end $E_R$ is relatively short, the coefficient $\beta$ is a value in the range of $-0.5\leq\beta<0$. Thus, the corrected first offset image RIM1' has a luminance distribution that increases or decreases in the horizontal direction.

Figure 10:
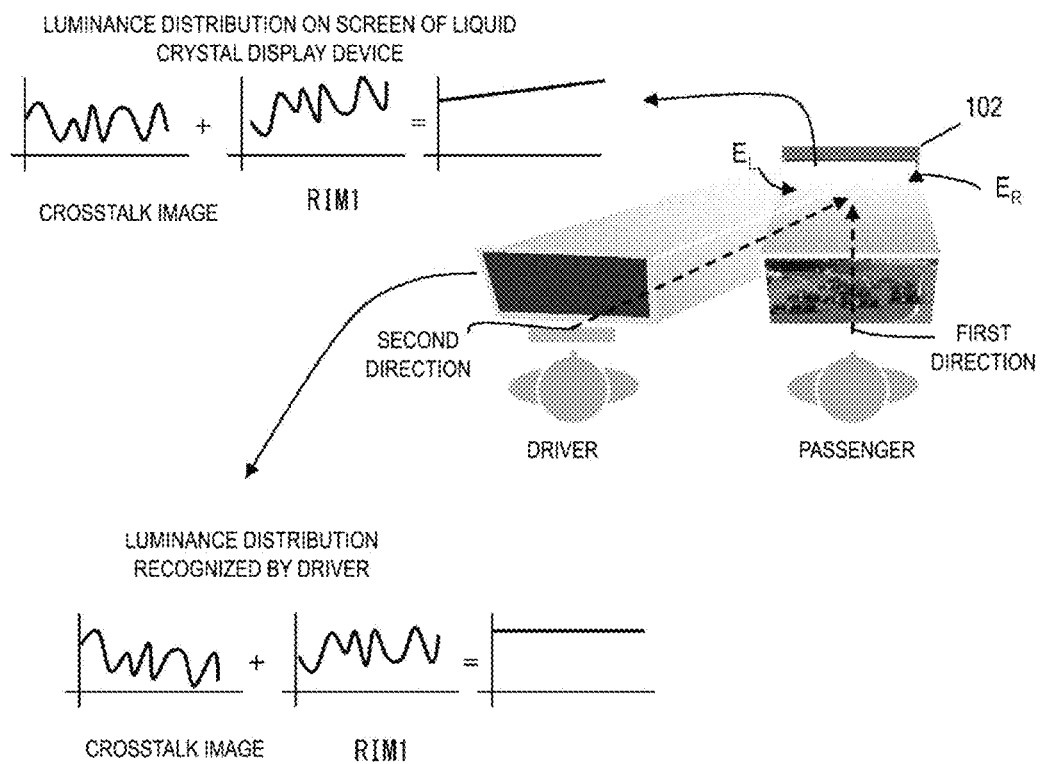
FIG. 10 is a schematic view illustrating an operation of a liquid crystal display device according to a second embodiment.

The control device 50 generates a second display image including the corrected first offset image RIM1' and controls the liquid crystal display device as described in the first embodiment. Thereby, as illustrated in FIG. 10, a crosstalk image of the first display image is efficiently canceled out, and a screen that is relatively bright on the end $E_R$ side and relatively dark on the end $E_L$ side is displayed on the screen of the liquid crystal display device 102. Since the distance from the driver to the end $E_R$ is relatively long, the driver can visually recognize an achromatic screen having a uniform luminance as a whole.

Third Embodiment

Figure 11:
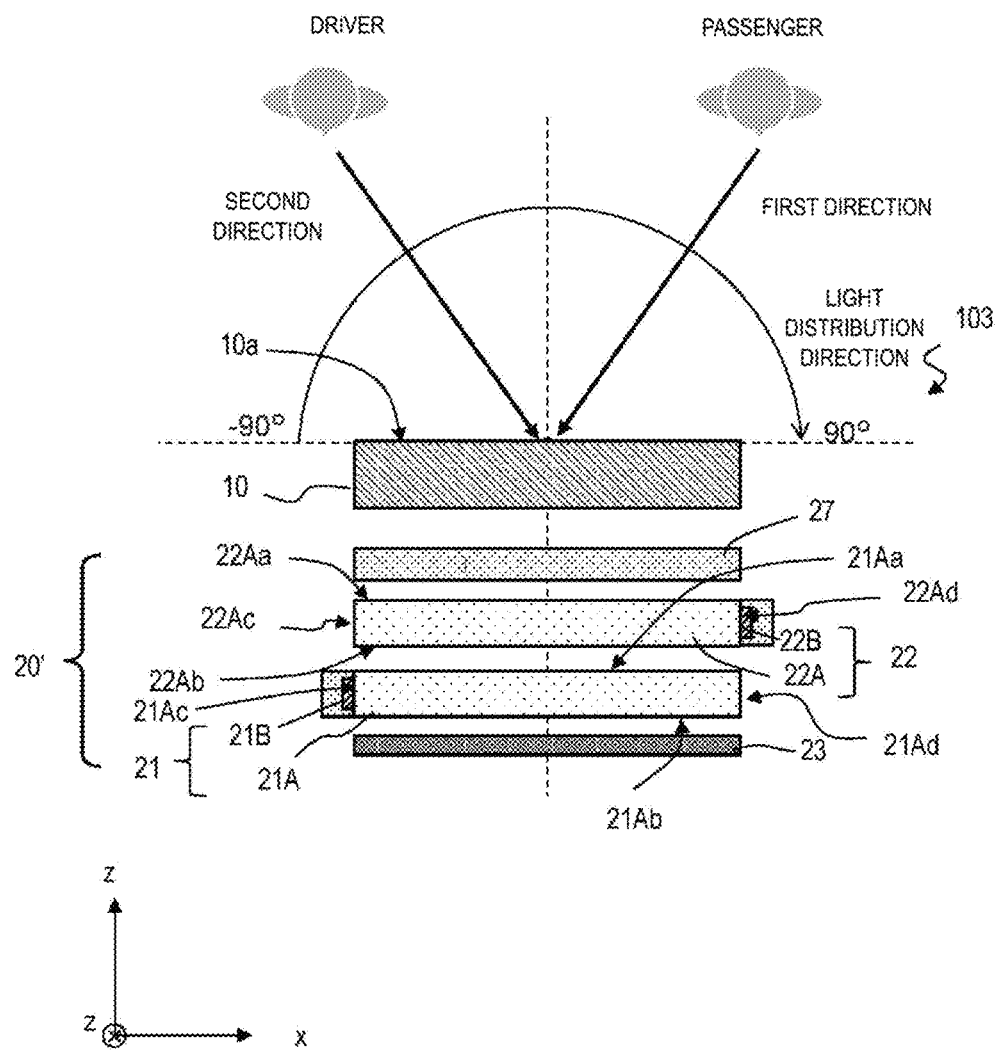
FIG. 11 is a schematic view illustrating a portion of a cross-sectional structure of a liquid crystal display device according to a third embodiment.

The liquid crystal display device according to the disclosure can also be preferably used as a display device capable of mutually suppressing crosstalk images when two observers view different images from two different directions. FIG. 11 is a schematic view illustrating a portion of a cross-sectional structure of a liquid crystal display device 103 according to the present embodiment. The liquid crystal display device 103 includes a liquid crystal display panel 10, a backlight module 20', and a control device 50 (FIG. 2).

The backlight module 20' includes a first backlight 21 and a second backlight 22. The first backlight 21 and the second backlight 22 have the structure described in the first embodiment.

The backlight module 20' may further include a reflection sheet 23 on a main surface 21Ab side of a first light guide plate 21A, and may further include a prism sheet 27 between the second backlight 22 and the liquid crystal display panel 10 in order to increase the directivity of first light and second light.

Figure 12:
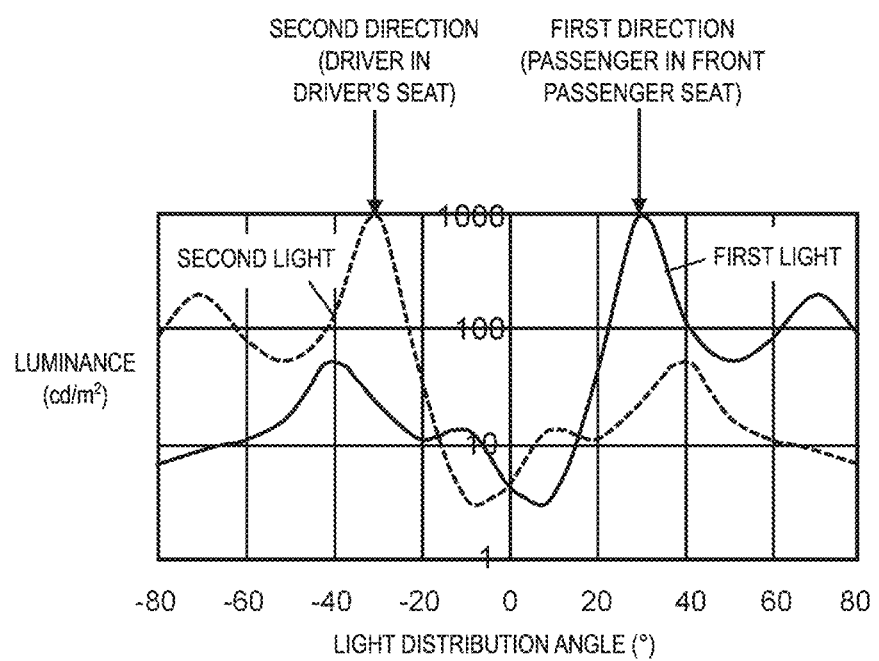
FIG. 12 illustrates an example of light distribution characteristics of first light and second light emitted from the liquid crystal display device according to the third embodiment.

FIG. 11 illustrates an example of light distribution characteristics of the first light and the second light emitted from the backlight module 20'. As described in the first embodiment, in the second backlight 22, the second light is incident from the side surface 22Bd of the second light guide plate 22A, and thus a distribution in an angle range in which a luminance is high deviates in the negative direction of the x-axis from the direction of 0° perpendicular to the main surface 10a. For example, as illustrated in FIG. 12, the luminance of the second light increases in a range of approximately −32°±10°. This angle range is referred to as a second direction. Similarly, in the first backlight 21, the first light is incident from a side surface 22Bc of the first light guide plate 21A, and thus a distribution in an angle range in which a luminance is high deviates in the positive direction of the x-axis from the direction of 0° perpendicular to the main surface 10a. For example, the luminance of the first light increases in a range of approximately 32°+10°. This angle range is referred to as a first direction.

The first direction and the second direction are substantially symmetrical with respect to 0° of an alignment property distribution. For this reason, for example, when the liquid crystal display device 103 according to the present embodiment is disposed in front of a portion between a driver's seat and a front passenger seat of a vehicle, it is possible to selectively distribute light to, for example, a passenger in the front passenger seat located in the first direction and a driver in the driver's seat located in the second direction. Thus, the liquid crystal display device 103 can present different images to the passenger and the driver.

For example, the control device 50 receives a first image and a second image, and presents the first image in the first direction and the second image in the second direction. The occurrence of crosstalk in which the first image is viewed from the second direction and the second image is viewed from the first direction is suppressed.

Figure 13:
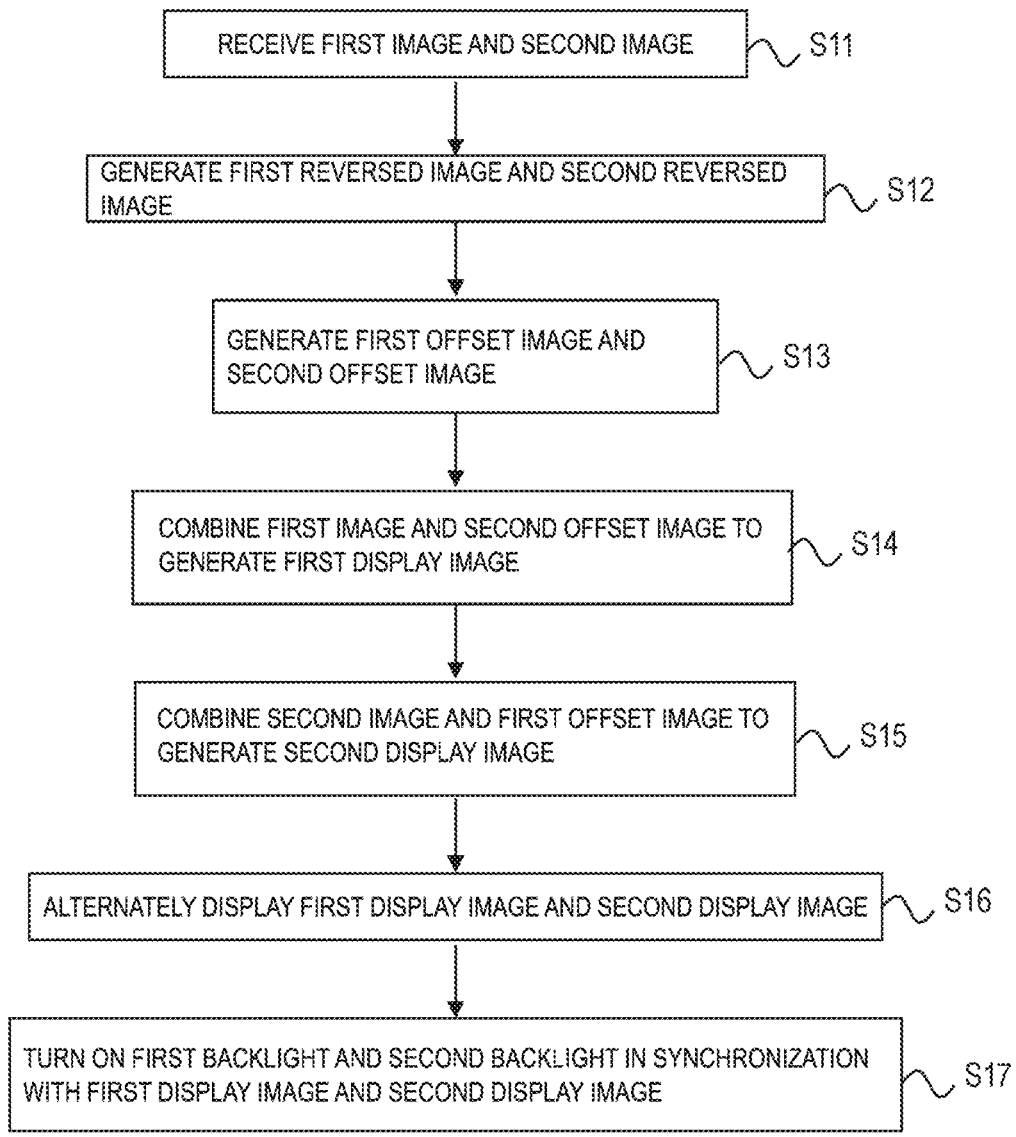
FIG. 13 is a flowchart illustrating an operation of the liquid crystal display device according to the third embodiment.

Operations of the liquid crystal display device 103 and the control device 50 according to the present embodiment will be described below. FIG. 13 is a flowchart showing an operation of the liquid crystal display device according to the present embodiment, and FIG. 14 is a schematic view illustrating image data to be generated.

(1) Generation of First Reversed Color Image and Second Reversed Color Image (S11, S12)

First, the control device 50 receives the first image and the second image, and generates a first reversed color image, which is a reversed color image of the first image, from the first image. The control device 50 generates a second reversed color image, which is a reversed color image of the second image, from the second image. For example, as illustrated in FIG. 6, the control device 50 generates a first reversed color image RIM1 which is a reversed color image of a first image IM1 and a second reversed color image RIM2 which is a reversed color image of a second image IM2. A luminance value of each pixel is obtained in the same manner as in Formula (1).

Figure 14:
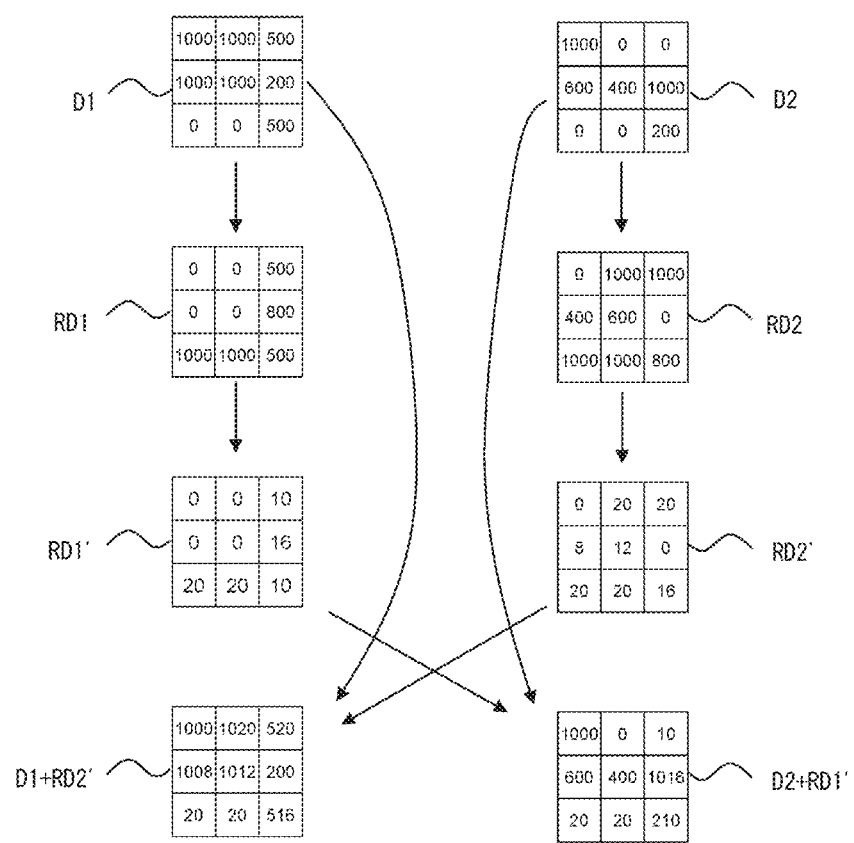
FIG. 14 is a schematic view illustrating an example of image data to be generated.

In FIG. 14, data D1 indicates an example of a luminance value of each pixel of the first image, and data D2 indicates an example of a luminance value of each pixel of the second image. Data RD1 and data RD2 indicate examples of a luminance value of the first reversed color image RIM1 and a luminance value of the second reversed color image RIM2, respectively.

(2) Generation of First Offset Image and Second Offset Image (S13)

The control device 50 stores a first crosstalk coefficient $a_{leak-1}$ which is the proportion of a luminance value of the first image IM1 emitted in the second direction when the first image IM1 is displayed in the first direction, and a second crosstalk coefficient $a_{leak-2}$ which is the proportion of a luminance value of the second image IM2 emitted in the first direction when the second image IM2 is displayed in the second direction.

The control device 50 generates a first offset image RIM1' and a second offset image RIM2' by multiplying the generated first reversed color image RIM1 and second reversed color image RIM2 by the first crosstalk coefficient $a_{leak-1}$ and the second crosstalk coefficient $a_{leak-2}$, respectively. In FIG. 14, data RD1' and data RD2' indicate examples of luminance values of the first offset image RIM1' and the second offset image RIM2'.

(3) Generation of First Display Image and Second Display Image (S14, S15)

The control device 50 generates a first display image to be displayed when the first backlight 21 is turned on and a second display image to be displayed when the second backlight 22 is turned on. Specifically, the control device 50 combines the first image IM1 and the second offset image RIM2' to generate the first display image (D1+RD2'). The control device 50 combines the second image IM2 and the first offset image RIM1' to generate the second display image (D2+RD1').

(4) Display of First Display Image and Second Display Image (S16, S17)

The control device 50 alternately displays the first display image and the second display image on the liquid crystal display panel 10. At this time, the control device 50 synchronizes the timing of switching between the display of the first display image and the display of the second display image with the timing of switching between turn-on of the first backlight 21 and turn-on of the second backlight 22. Specifically, the control device 50 turns on the first backlight 21 at a timing when the first display image is displayed on the liquid crystal display panel 10, and turns on the second backlight 22 at a timing when the second display image is displayed on the liquid crystal display panel 10.

The first display image includes components of the second offset image RIM2'. For this reason, even when a crosstalk image of the second image is presented to the passenger positioned in the first direction, the crosstalk image of the second image is efficiently canceled out by the components of the second offset image RIM2'. Thus, the passenger can visually recognize a good first image without recognizing the components of the second image in the first display image displayed on the liquid crystal display device 103.

Similarly, the second display image includes components of the first offset image RIM1'. For this reason, even when a crosstalk image of the first image is presented to the driver positioned in the second direction, the crosstalk image of the first image is efficiently canceled out by the components of the first offset image RIM1'. Thus, the driver can visually recognize a good second image without recognizing the components of the first image in the second display image displayed on the liquid crystal display device 103.

Other Embodiments

Various modifications can be made to the liquid crystal display device of the disclosure. For example, as long as a backlight unit includes the first backlight 21 and the second backlight 22, the backlight unit may further include other optical elements such as a diffuser sheet that makes a distribution of light uniform, a luminance enhancement film that enhances the emission efficiency of light to the liquid crystal display panel 10 side, and a prism sheet that enhances the directivity of light.

The first to third embodiments can be combined as appropriate. For example, the first image and the second image may be displayed on the liquid crystal display device 101 according to the first embodiment.

In the above-described embodiments, first, a first reversed image of a reversed color is generated from a first image, and then, a first offset image is generated by multiplying the first reversed image by a first crosstalk coefficient. However, a first offset image may be generated by first multiplying each pixel value of the first image by the first crosstalk coefficient and then generating an image of a reversed color. Alternatively, these operations may be performed at once.

Figure 15A:
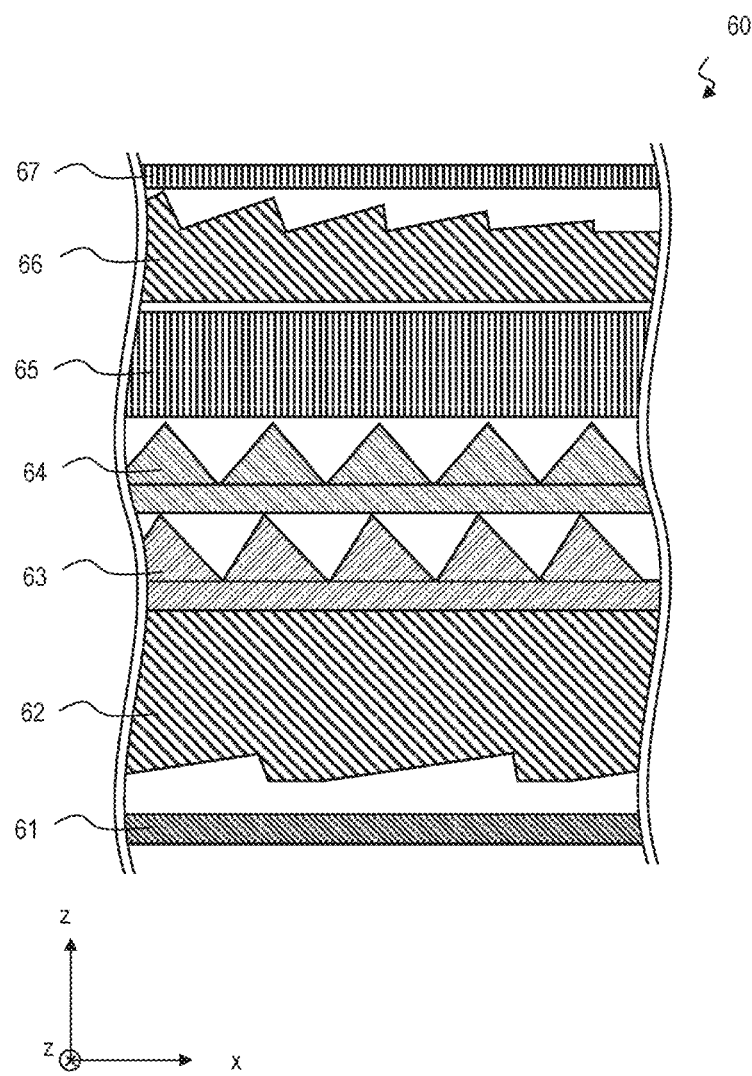
FIG. 15A is a schematic cross-sectional view illustrating another example of a light control body.

For example, the light control body 30 according to the first embodiment may have other structures. For example, the liquid crystal display device may include a light control body 60 illustrated in FIG. 15A.

The light control body 60 includes a reflection sheet 61, a light guide plate 62, prism sheets 63 and 64, a first optical sheet 65, a lens sheet 66, and a second optical sheet 67.

Figure 15B:
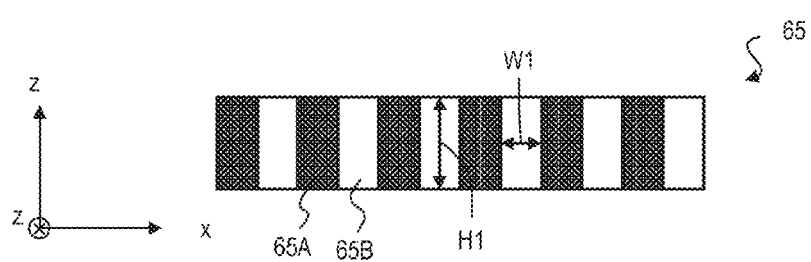
FIG. 15B is a schematic view illustrating a cross-sectional structure of a first optical sheet.
Figure 15C:
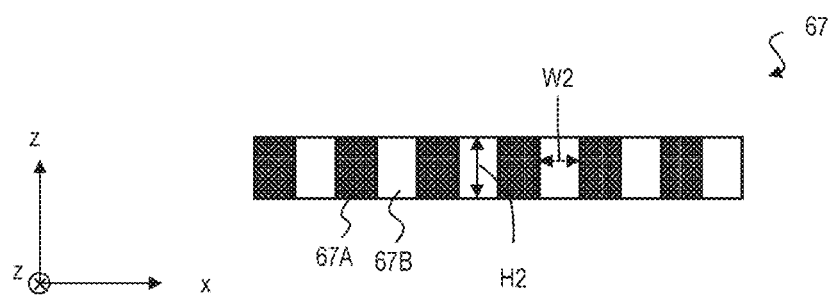
FIG. 15C is a schematic view illustrating a cross-sectional structure of a second optical sheet.

The first optical sheet 65 has the same structure as that of the first optical sheet 31 according to the first embodiment. Specifically, as illustrated in FIG. 15B, the first optical sheet 65 includes a plurality of first light blocking portions 65A disposed at intervals in the x-axis direction and a plurality of first light transmitting portions 65A each located between the plurality of first light blocking portions 65B. Each first light blocking portion 65A extends in the z-axis direction (thickness direction) and the y-axis direction. It is preferable that a width W1 in the x-axis direction and a height H1 in the z-axis direction of each first light transmitting portion 65B satisfy a relationship W1/H1>1.

The lens sheet 66 is a linear Fresnel lens that is located between the first optical sheet 65 and the second optical sheet 67 and extends in the y-axis direction.

The second optical sheet 67 has a structure similar to that of the first optical sheet 65. Specifically, the second optical sheet 67 includes a plurality of second light blocking portions 67A disposed at intervals in the x-axis direction and a plurality of second light transmitting portions 67B each located between the plurality of second light blocking portions 67A. Each second light blocking portion 67A extends in the z-axis direction (thickness direction) and the y-axis direction. A width W2 in the x-axis direction and a height H2 in the z-axis direction of each second light transmitting portion 67B satisfy a relationship W2/H2>W1/H1.

According to such a structure, light obliquely incident on the lens sheet 66 is suppressed by the first optical sheet 65, and the light can be mainly incident in a direction perpendicular to the lens sheet 66. Thus, light can be converged at the center in accordance with optical characteristics of the lens sheet 66, that is, optical characteristics of the linear Fresnel lens.

Obliquely incident light in light passing through the lens sheet 66 is suppressed by the second optical sheet 67. However, the relationship of W2/H2>W1/H1 is satisfied, and thus the degree of absorption of obliquely transmitted light by the second optical sheet 67 is smaller than that by the first optical sheet 65. For this reason, the optical characteristics of the lens sheet 66 are appropriately suppressed. For example, a light condensing function of the lens sheet 66 prevents a luminance at the center of a screen from increasing and a luminance at the periphery from decreasing.

A liquid crystal display device according to the disclosure can be described as follows.

A liquid crystal display device according to a first configuration includes:
  a backlight module configured to switch between first light having a maximum luminance in a first direction and second light having a maximum luminance in a second direction different from the first direction and emit the first light and the second light from a main surface;
  a liquid crystal display panel configured to be disposed to transmit the first light and the second light; and
  a control device configured to control the liquid crystal display panel and the backlight module,
  wherein
  the control device
  receives a first image and generates a first offset image based on the first image, the first offset image being an image obtained by reversing a color of the first image and having a luminance adjusted,
  controls the liquid crystal display panel such that a first display image including the first image and a second display image including the first offset image are alternately displayed, and
  controls the backlight module so that the first light is emitted when the first display image is displayed and the second light is emitted when the second display image is displayed, and
  a luminance of the first offset image is substantially equal to a luminance in the second direction when the liquid crystal display panel displays the first display image.

According to the liquid crystal display device of the first configuration, when the second backlight is turned on, an image in which the color of the first image is reversed is displayed after the luminance has been adjusted. For this reason, when the liquid crystal display device is viewed from the second direction, a crosstalk image of the first display image is efficiently canceled out, and an achromatic screen with a uniform luminance is displayed. Thus, it is possible to prevent the first display image from being visually recognized in the second direction.

In a liquid crystal display device of a second configuration according to the first configuration, the first offset image may have a luminance distribution that increases or decreases in a linear direction in which a plane including the first direction and the second direction intersects a surface of the liquid crystal display panel.

In a liquid crystal display device of a third configuration according to the first configuration, the liquid crystal display panel may have a refresh rate equal to or higher than 240 Hz.

In a liquid crystal display device of a fourth configuration according to the first configuration,
the control device may
receive a second image and further generates a second offset image based on the second image, the second offset image being an image obtained by reversing a color of the second image and having a luminance adjusted,
generate the first display image obtained by combining the first image and the second offset image, and
generate the second display image obtained by combining the second image and the first offset image.

In a liquid crystal display device of a fifth configuration according to the first configuration,
the backlight module may include
a first backlight configured to emit the first light,
a second backlight configured to emit the second light, and
a light control body disposed between the first backlight and the second backlight and including a first optical sheet,
the second backlight may be located between the first backlight and the liquid crystal display panel,
the first optical sheet may include a plurality of first light blocking portions disposed at intervals in a third direction perpendicular to a thickness direction, and a plurality of first light transmitting portions each located between the plurality of first light blocking portions,
each light blocking portion may extend in a fourth direction perpendicular to the third direction and the thickness direction, and the thickness direction, and
a width W1 in the third direction and a height H1 in the thickness direction of each first light transmitting portion may satisfy a relationship of $W1/H1>1$.

In a liquid crystal display device of a sixth configuration according to the fifth configuration,
the light control body may further include a second optical sheet and a lens sheet,
the lens sheet may be a linear Fresnel lens located between the first optical sheet and the second optical sheet and having an axis parallel to the fourth direction,
the second optical sheet may be located between the second backlight and the lens sheet,
the second optical sheet may include a plurality of second light blocking portions disposed at intervals in the third direction and a plurality of second light transmitting portions each located between the plurality of second light blocking portions,
each second light blocking portion may extend in the fourth direction and the thickness direction, and
a width W2 in the third direction and a height H2 in the thickness direction of each second light transmitting portion may satisfy a relationship of $W2/H2>W1/H1$.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device comprising:
a backlight module configured to switch between first light having a maximum luminance in a first direction and second light having a maximum luminance in a second direction different from the first direction and to emit the first light and the second light from a main surface;
a liquid crystal display panel configured to be disposed to transmit the first light and the second light; and
a control device configured to control the liquid crystal display panel and the backlight module,
wherein
the control device
receives a first image and generates a first offset image based on the first image, the first offset image being an image obtained by reversing a color of the first image and having a luminance adjusted,
controls the liquid crystal display panel such that a first display image including the first image and a second display image including the first offset image are alternately displayed, and
controls the backlight module so that the first light is emitted when the first display image is displayed and the second light is emitted when the second display image is displayed, and
the luminance of the first offset image is substantially equal to a luminance in the second direction when the liquid crystal display panel displays the first display image.

2. The liquid crystal display device according to claim 1, wherein the first offset image has a luminance distribution that increases or decreases in a linear direction in which a plane including the first direction and the second direction intersects a surface of the liquid crystal display panel.

3. The liquid crystal display device according to claim 1, wherein the liquid crystal display panel has a refresh rate equal to or higher than 240 Hz.

4. The liquid crystal display device according to claim 1, wherein the control device
receives a second image and further generates a second offset image based on the second image, the second offset image being an image obtained by reversing a color of the second image and having a luminance adjusted,
generates the first display image obtained by combining the first image and the second offset image, and
generates the second display image obtained by combining the second image and the first offset image.

5. The liquid crystal display device according to claim 1, wherein the backlight module includes
a first backlight configured to emit the first light,
a second backlight configured to emit the second light, and
a light control body disposed between the first backlight and the second backlight and including a first optical sheet,
the second backlight is located between the first backlight and the liquid crystal display panel,
the first optical sheet includes a plurality of first light blocking portions disposed at intervals in a third direction perpendicular to a thickness direction, and a plurality of first light transmitting portions each located between the plurality of first light blocking portions, each first light blocking portion extends in a fourth direction perpendicular to the third direction and the thickness direction, and the thickness direction, and a width W1 in the third direction and a height H1 in the thickness direction of each first light transmitting portion satisfy a relationship of W1/H1>1.

6. The liquid crystal display device according to claim 5, wherein the light control body further includes a second optical sheet and a lens sheet, the lens sheet is a linear Fresnel lens located between the first optical sheet and the second optical sheet and has an axis parallel to the fourth direction, the second optical sheet is located between the second backlight and the lens sheet, the second optical sheet includes a plurality of second light blocking portions disposed at intervals in the third direction and a plurality of second light transmitting portions each located between the plurality of second light blocking portions, each second light blocking portion extends in the fourth direction and the thickness direction, and a width W2 in the third direction and a height H2 in the thickness direction of each second light transmitting portion satisfy a relationship of W2/H2>W1/H1.

\* \* \* \* \*